Figure 1:
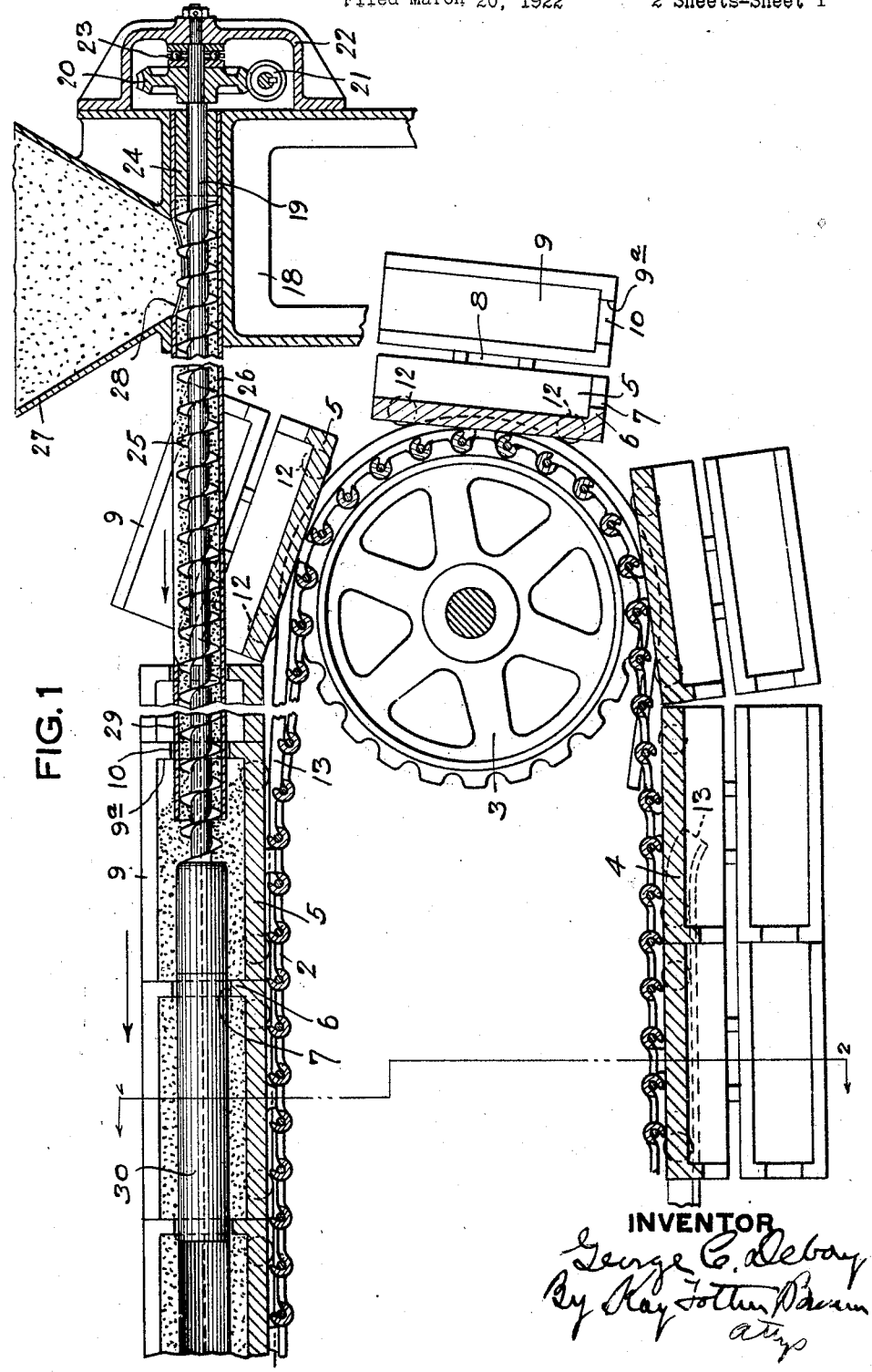

May 26, 1925.

G. C. DEBAY 1,539,303

MACHINE FOR MAKING HOLLOW TILE

Filed March 20, 1922

2 Sheets-Sheet 1

INVENTOR
George C. Debay
By Kay Totten Brown
Attys

May 26, 1925.                                                                1,539,303
G. C. DEBAY
MACHINE FOR MAKING HOLLOW TILE
Filed March 20, 1922          2 Sheets-Sheet 2
FIG. 2
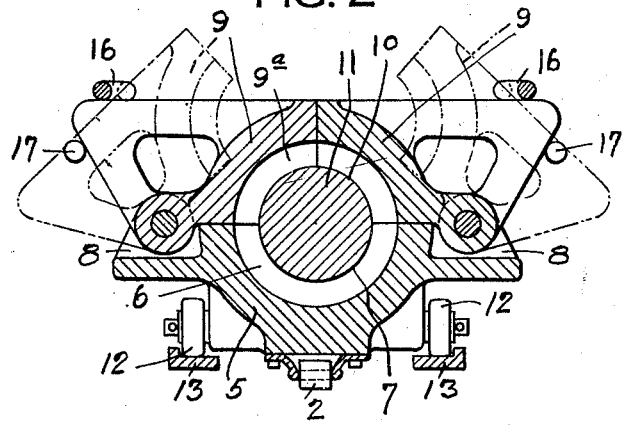
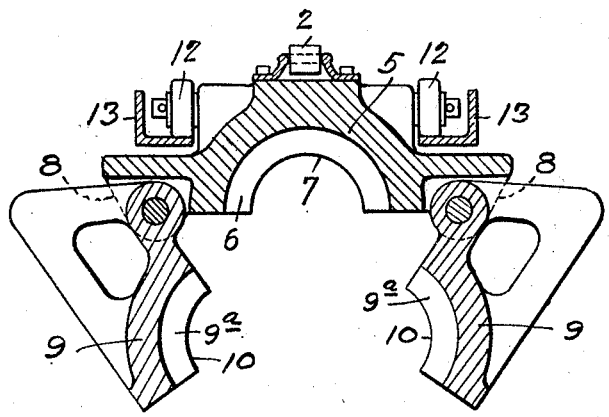
FIG. 3
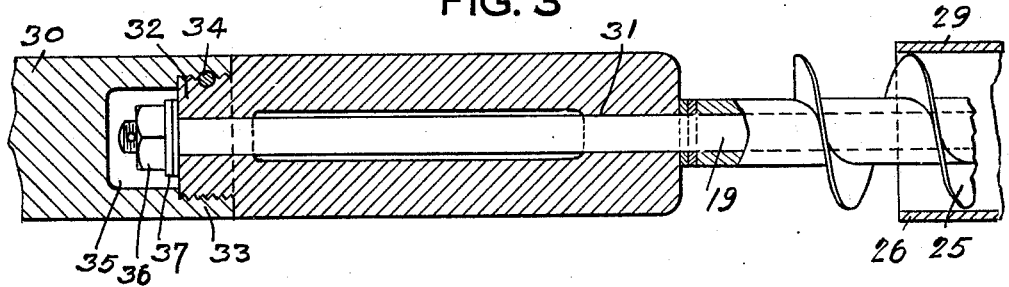
INVENTOR
George C. Debay Patented May 26, 1925.

1,539,303

UNITED STATES PATENT OFFICE.

GEORGE C. DEBAY, OF SPRINGDALE, PENNSYLVANIA.

MACHINE FOR MAKING HOLLOW TILE.

Application filed March 20, 1922. Serial No. 545,164.

*To all whom it may concern:*

Be it known that I, GEORGE C. DEBAY, a citizen of the United States, and resident of Springdale, in the county of Allegheny and State of Pennsylvania, have invented a new and useful Improvement in Machines for Making Hollow Tile; and I do hereby declare the following to be a full, clear, and exact description thereof.

My invention relates to machines for making hollow tile, whether round, square or of other shape.

The object of my invention is to provide a machine in which the material is so introduced into the mold as to be densely packed around the core so as to provide a tile of proper density and compactness, and one in which tiles may be made in quick succession.

Fig. 1 of the drawing shows a longitudinal side elevation of my improved apparatus, partly broken away; Fig. 2 is a section on the line 2—2, Fig. 1; and Fig. 3 is a detail of the manner of connecting the spiral conveyer to the core-bar.

In Letters Patent of the United States, No. 1,362,928 granted to me on the 21st day of December, 1920, I have described and claimed a machine for making hollow building blocks in which there is an endless conveyer with mold members mounted thereon, the mold members comprising bottom and end portions with hinge sections and openings therein coinciding with openings formed in the end of the mold-members, said hinge sections being adapted to fold over and enclose the stationary core-bar, so that said hinge sections, as the molds come around in position for filling, are closed over and around the core bar before the material is introduced to the mold. In this manner it is possible to use a stationary core-bar and a continuous series of molds which come around in position to be charged one after the other in succession without stopping and without removing the core-bars.

I have illustrated my invention in connection with the making of a circular hollow tile, but it is apparent that my invention may be used for making other shapes.

In the drawing the numeral 2 designates a suitable endless conveyer-chain which passes around a sprocket-wheel 3 and around a similar sprocket-wheel (not shown). One of the sprocket-wheels is driven by any suitable power.

Connected to the endless chain 2 are the mold-members 4 which comprise the lower portions 5 and the end portions 6 having the openings 7 formed therein.

Hinged to the lugs 8 on the lower portion 5 are the swinging sections 9 which are cut away at their inner ends 9ª, as at 10, to conform to that portion of the core-bar 11 which they are adapted to enclose.

The lower portion 5 of the mold-member has the rollers 12 mounted thereon to move along tracks 13 when the mold is in inverted position or is moving around the sprocket wheel 3, as clearly shown in Fig. 1. These rollers 12 relieve the friction and reduce the amount of power required for moving the molds.

Guides 16 are provided in the path of the swinging sections 9 to move said sections over into position to enclose the core-bar, as clearly shown in Fig. 2. Beyond the guides 16 are retaining bars 17 which act to hold the swinging sections 9 in closed position while the material is being packed into the mold.

Mounted in the frame 18 is the shaft 19 with the worm-wheel 20 mounted thereon driven by the worm 21 connected up to a motor or suitable engine. The shaft 19 extends through the casing 22, and a thrust bearing 23 is interposed between said casing and the worm-wheel 20.

The shaft 19 is journaled in the sleeve 24, and beyond said sleeve are the spirals 25 which move in the circular trough 26. The material from which the tiles are to be formed is carried in the hopper 27 and passes by the opening 28 into the trough 26 where the spiral conveyer picks it up and carries it along the said trough, said trough being completely closed at its forward end 29.

Beyond the end of the trough 26 the spiral conveyer is connected to the core-bar 30, and such connection may be in the form illustrated in Fig. 3, in which the forward end of the shaft 19 passes into the bore 31 of the core-bar which has the threaded neck 32 through which the extension 33 is connected, the pin 34 being employed to prevent the unscrewing of said connection. The shaft 19 passes into the chamber 35 in the extension 33, and the nut 36 is secured to said shaft, the washers 37 being interposed between said nut and the neck 32. In this manner a swivel connection is formed between the shaft 19 and the core bar, which permits the shaft to rotate while said core-bar remains stationary.

In the operation of making hollow tile with the above apparatus, the material is delivered to the hopper 27 and thence by the opening 28 into the trough 26. The shaft 19 is revolved and the spiral conveyer 25 put in operation, which conveys the material along the trough and discharges it from the end thereof into one of the molds which is moving along at a sufficiently slow rate of speed that the material discharged by the spiral conveyer 25 into the mold will be packed solidly around the core-bar to form a compact, dense structure. The mold members, as they come around in succession, have their hinge sections 9 operate to fold over the trough 26, and when the front ends of said molds reach the rear end of the trough 26, the material is delivered to the molds, and as said molds continue to advance at a comparatively slow rate of speed the material is delivered in such quantities as to be packed in the mold and around the core-bar 30, to give a very dense compact structure to the tile. When the mold reaches the discharge end of the machine the foldable members 9 of the mold are opened and the tile removed without the stopping of the machine.

It will be apparent that a plurality of core-bars may be employed where the tile is to have more than one opening, and that the tiles may be made in different shapes without departing from the spirit of my invention.

What I claim is:

1. In apparatus for forming a hollow tile, the combination of an endless conveyer, mold-members carried thereby, foldable sections on said mold members, a horizontally arranged trough adapted to be enclosed by said foldable sections of said mold, a spiral conveyer in said trough, and a horizontally arranged core-bar connected to the outer end of said spiral conveyer.

2. Molding apparatus comprising an endless chain having a flight disposed in a rectilinear path, a feed screw disposed adjacent to one end of said flight, a conduit for said feed screw, a core bar disposed parallel to said flight and having one end located adjacent to the discharge end of said conduit, partible molds carried by said chain and adapted to surround said core bar when moving along said flight, and means for causing said molds to close when entering said flight.

In testimony whereof I, the said GEORGE C. DEBAY, have hereunto set my hand.

GEORGE C. DEBAY.

Witnesses:
JOHN F. WILL,
HENRY HOLZ.